Figure 1:
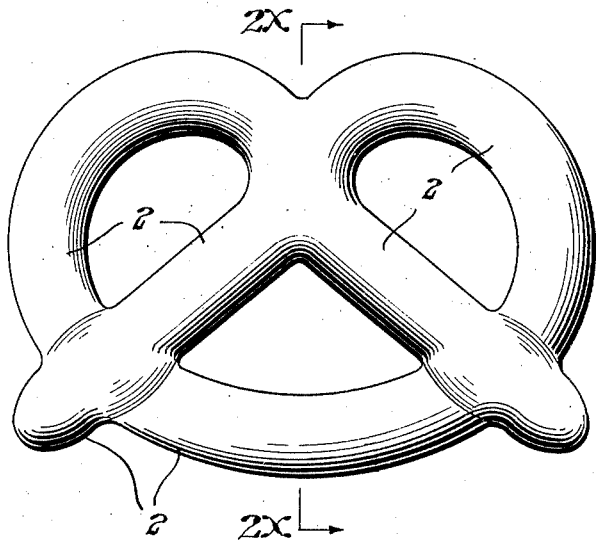
Figure 2:
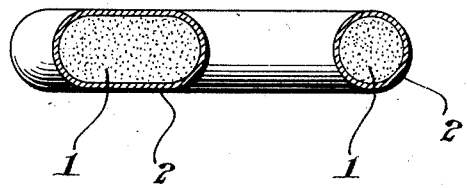

L. J. SCHUMAKER.
FOOD PRODUCT.
APPLICATION FILED DEC. 2, 1919.

1,366,961.

Patented Feb. 1, 1921.

INVENTOR:
Lorraine J. Schumaker,
BY Charles N. Butler
ATTORNEY.

UNITED STATES PATENT OFFICE.

LORRAINE J. SCHUMAKER, OF PHILADELPHIA, PENNSYLVANIA, ASSIGNOR TO THE AMERICAN PRETZEL COMPANY, OF PHILADELPHIA, PENNSYLVANIA, A CORPORATION OF WEST VIRGINIA.

FOOD PRODUCT.

1,366,961.     Specification of Letters Patent.     Patented Feb. 1, 1921.

Application filed December 2, 1919. Serial No. 341,975.

*To all whom it may concern:*

Be it known that I, LORRAINE J. SCHUMAKER, a citizen of the United States, residing at Philadelphia, in the county of Philadelphia and State of Pennsylvania, have invented a new and Improved Food Product, of which the following is a specification.

My improved product is a pretzel having an edible coating adapted for excluding moisture, preserving the crispness of the body and providing a delicious food.

The pretzel is made preferably from a combination of flour, shortening, salt and water forming a dough, which is shaped, thoroughly baked and dried.

Dryness and crispness in the product are highly desirable characteristics which are too readily lost by the absorption of moisture due to exposure to the atmosphere, particularly in damp weather, as is well known.

It has long been a desideratum to preserve these desired characteristic properties of the pretzel, without deteriorating the product, but no satisfactory means have been known heretofore for accomplishing this result.

I have found that the desired dryness and crispness of the pretzel may be preserved and a delicious food product obtained by providing the same with a proper edible coating that will exclude the moisture and preserve the dryness of the body of the pretzel, particularly a coating of sweet chocolate or vanilla.

Pretzels thus coated preferably so that they are fully covered, remain dry and crisp, are greatly improved in taste, and provide a highly valuable, as well as delicious and wholesome food product that can be handled, shipped and stored readily without being damaged or deteriorated.

The accompanying drawings illustrate a pretzel made by baking and then drying dough obtained by mixing wheat flour, shortening, salt and water and formed in the usual manner, the body being mainly a white wheat flour product.

The dry and crisp product thus produced is then provided with a coating 2 of flavored edible material such as sweet chocolate preferably, that will exclude moisture from the body and provide a more tasty food.

A desirable coating is provided by a mixture by weight of say sixty-five parts sugar, twenty-five parts chocolate, five parts cocoa butter, four parts gum arabic and one part acacia.

Having described my invention, I claim:

1. A pretzel comprising a dry crisp body mainly of baked wheat flour and a chocolate coating inclosing said body and adapted for excluding moisture therefrom.

2. A pretzel having a dry and crisp body, mainly of baked wheat flour, provided with an edible coating containing sugar, chocolate and cocoa butter.

In testimony whereof I have hereunto set my hand this 28th day of November, 1919.

LORRAINE J. SCHUMAKER.